March 12, 1968  HEIHACHI ISHIMATSU  3,372,442

SYNTHETIC RESIN FASTENER

Filed July 18, 1966

Heihachi Ishimatsu,
INVENTOR

BY Wenderoth, Lind
and Ponack ATTORNEYS 3,372,442
Patented Mar. 12, 1968

3,372,442
SYNTHETIC RESIN FASTENER
Heihachi Ishimatsu, Neyagawa-shi, Osaka-fu, Japan, assignor to High Polymer Chemical Industries, Ltd., Osaka, Japan
Filed July 18, 1966, Ser. No. 565,921
Claims priority, application Japan, Sept. 18, 1965, 40/76,090
2 Claims. (Cl. 24—201)

ABSTRACT OF THE DISCLOSURE

A synthetic resin fastener comprising, in combination, a female talon having a pair of facing, base ridges whose distal ends are provided, respectively, with an obliquely, inwardly and downwardly facing long-pointed projection and a similarly constituted short-pointed projection, and in the space between said facing ridges a peaked ridge having a triangular section which inclines towards said long-pointed projection at an angle up to 10 degrees with respect to a perpendicular to the base plane of the female talon; and a male talon having respectively at its two sides an obliquely, outwardly and upwardly facing deep hook groove and a similarly constituted shallow hook groove, and in its central part a valley like groove of triangular section corresponding with the peaked ridge of said female talon, the configurations of said deep and shallow hook grooves being such that they are capable of fittingly engaging with the respective long and short pointed projections of said female talon.

---

This invention relates to an improvement in synthetic resin fasteners comprising a pair of male and female talons, which, being attached to the mouth of bags made of synthetic resin films, are used for opening and closing such bags.

Various types of occludent means which can be used as sealing devices for bags made of synthetic resin films have been proposed heretofore. However, owing to the fineness of the structure of the male and female talons, the operation of bringing these two parts into engagement have not necessarily been an easy task. Moreover, as to the state of their engagement they were not wholly satisfactory either, there being the defect that accidental opening of the bag would occur, and especially a tendency of the bag opening on its own as a result of a force applied from the interior of the bag.

An object of the present invention is to provide a synthetic resin fastener which can be readily closed and opened but on the other hand does not open on its own.

Other objects and advantages of this invention will be apparent from the following description.

A fastener of this invention, by which the foregoing objects are attained, will be described below in connection with the accompanying drawings which are magnified sectional views cut vertically at right angles to the lengthwise direction of the taloned ridge, in a state in which the male and female taloned ridge of the invention are attached to that part of the bag of synthetic resin film in the vicinity of its mouth.

Figure 1:
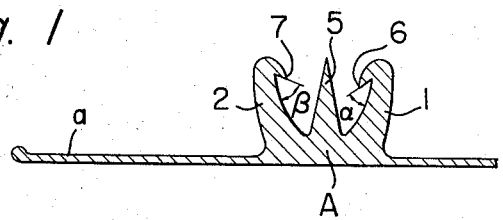
Figure 2:
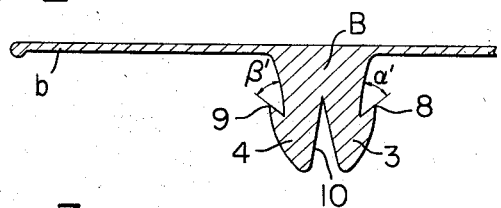
Figure 3:
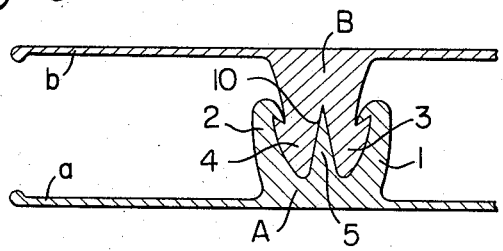
Figure 4:
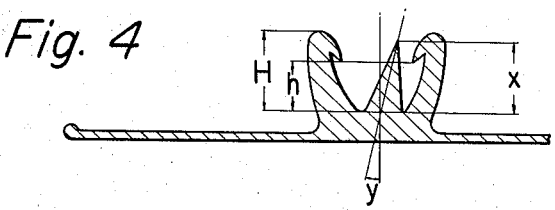
Figure 5:
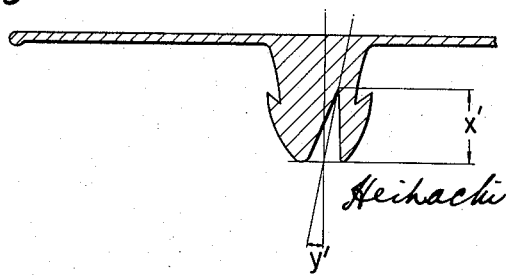

FIGURE 1 is a view of a female talon;
FIGURE 2 is a view of a male talon;
FIGURE 3 is a view illustrating the male and female talons in their engaged state;
FIGURE 4 is another embodiment of the female talon shown in FIGURE 1; and
FIGURE 5 is another embodiment of the male talon shown in FIGURE 2.

The bottom of the bag (at the right side of the drawings) has been omitted and is not shown. While various methods can be employed for attaching the male and female talons to the mouth of a bag, such as extrusions of the talons and the film in one piece or attaching the separately formed talons by self-fusion or by means of an adhesive, the purport of this invention does not reside in such a means of attachment but resides in the construction and sectional configuration of the fastener itself which is made up of a pair of male and female talons, which may or may not be in attachment with films. In the following description and the appended claims, reference to top and bottom or left and right is meant to be the top and bottom or left and right in the drawings.

In the present invention, a female talon A attached in the vicinity of the mouth portion of film a, one of the two sheets of films which facing each other make up a bag, comprises, as shown in FIGURE 1, a pair of facing basic ridges 1 and 2 provided at their top ends with respectively an obliquely, inwardly and downwardly facing long-pointed ridge 6 and a similarly constituted short-pointed ridge 7, and in the space between said facing ridges 1 and 2 a peaked ridge 5 of a triangular section, the disposition of said pair of basic ridges 1 and 2 being such that the former with the long-pointed ridge 6 is at the side inside the bag (at the right side in the drawings) and the latter with the short-pointed ridge 7 is at the mouth side (at the left side in the drawings). A male talon B, which is attached in the vicinity of the mouth portion of the other film b, has, as shown in FIGURE 2, at its two sides respectively an obliquely, outwardly and upwardly facing deep hook groove 8, a similarly constituted shallow hook groove 9 and at the same time a valleylike groove 10 of triangular section in its central part which corresponds with the foregoing peaked ridge 5 of female talon A. Thus the configurations of the deep hook groove 8 and the shallow hok groove 9 are such that they are capable of engagement fittingly with respectively the long-pointed ridge 6 and the short-pointed ridge 7 of female talon A. In other words, the synthetic resin fastener of this invention is featured in the points that in a fastener comprising a female talon A having basic ridges 1 and 2 which have been equipped at their distal ends with respectively an obliquely, inward and downwardly facing long-pointed ridge 6 and a similarly constituted short-pointed ridge 7, and a male talon B equipped with an obliquely, outwardly and upwardly facing deep hook groove 8 and a similarly constituted shallow hook groove 9, which fit respectively with said long-pointed ridge 6 and short-pointed ridge 7, a peaked ridge 5 of triangular section has been disposed in between the two basic ridges of the female talon A and by disposing in the central part of the male talon B a valleylike groove 10 of triangular section which corresponds to said peaked ridge 5 a bifurcated talon consisting of talons 3 and 4 has been formed.

In a preferred embodiment of this invention, the angle $\beta$-formed between the short-pointed ridge 7 and the basic ridge 2 or the angle $\beta'$ formed between the shallow hook groove 9 and a side of the male talon B is greater than the angle $\alpha$ formed between the long-pointed ridge 6 and the basic ridge 1 or the angle $\alpha'$ formed between the deep hook groove 8 and a side of the male talon B. Thus, the opening of the bag on its own as a result of a force from the inside of the bag is prevented after the fastener has been once closed.

The peaked ridge 5 of triangular section must have a height which is at least higher than the distal ends of the pointed ridges 6 and 7 which have been provided on the basic ridges 1 and 2. Normally, a height of about that of the basic ridges 1 and 2 are used. The reason for imposing a limitation such as this on the height of the peaked ridge 5 is for the purpose of ensuring that the peaked ridge will act as a guide for the male talon. If it is either too high or too low, it cannot perform the function of a guide. Further, when the height of the peaked ridge 5 is too high, it is not desirable for there is the possibility that the engaging operation will be rendered difficult as a result of the deformation of the tip of said peaked ridge.

The peaked ridge 5, besides functioning as the guide of the male talon B as described above, also functions to prevent the bag from opening on its own from a force exerted from the inside of the bag. The reason therefor is as follows. As is self-evident when examination is made with reference being had to FIGURE 3, should it happen that a force be exerted from the inside of the bag tending to unfasten the engagement between the pointed ridge 6 and the hook groove 8 at the inner side of the bag, this force is dispersed by the means of the peaked ridge 5 which acts as a buffer wall and hence prevents the bag from opening on its own. In the embodiment illustrated in FIGURES 1 to 3, the peaked ridge 5 is shown as being one having a substantially isosceles triangular section, but if, as shown in FIGURES 4 and 5, this peaked ridge is provided with a triangular section which inclines slightly towards the inside of the bag or the side of the long-pointed ridge 6, e.g. a triangular section whose left side is somewhat longer than the right side, this effect is enhanced still more greatly. If it inclines too much however, its function as a guide will suffer. Hence, the extent to which the peaked ridge 5 is to be inclined must be decided suitably according to the circumstances involved. Normally, when the peaked ridge inclines towards the inner side of the bag within an angle of 10 degrees ($y$ in FIGURE 4) with respect to a perpendicular to the film plane (i.e. the basic surface of the female talon), satisfactory results are obtained.

Further, it is, also of course, necessary to modify the valleylike groove 10 of the male talon in correspondence with the modifications in the height and inclination of the peaked ridge 5, as hereinabove described.

The following examples are for further illustrating the invention fastener in still more detail.

*Example 1*

A fastener for test use consisting of a pair of male and female fastener parts, as shown in FIGURES 4 and 5, which were formed from a material comprising "Elrex 112–DQ" (a product of Rexall Drug Company, U.S.A.), in which were mixed 2% of a blue pigment PCM–6020 (a product of Dainichi Seika Company, Ltd., Japan), was fused to a 0.08 mm.-thick film of polyethylene resin "Elrex 112–DQ," the male and female parts being arranged in parallel a given distance apart. In this case, the dimensions in FIGURES 4 and 5 were $H=1.4$ mm., and $h=0.7$ mm., while $x$, $x'$, $y$ and $y'$ were as indicated in Table I, below. In Table I, Sample 1 is presented as a control, it being the instance of one of the conventional fasteners which does not have the peaked ridge.

TABLE I

| Sample No. | x (mm.) | y÷y' (°) | x' (mm.) |
|---|---|---|---|
| 1 | 0 | 0 | 0 |
| 2 | 1.6 | 0 | 1.3 |
| 3 | 1.3 | 0 | 1.3 |
| 4 | 1.0 | 0 | 1.3 |
| 5 | 0.5 | 0 | 0.6 |
| 6 | 1.0 | 5 | 1.3 |
| 7 | 1.0 | 10 | 1.3 |
| 8 | 1.0 | 15 | 1.3 |

A folding apparatus used in making synthetic resin film bags was equipped with fastener interlocking rollers consisting of a pair of steel rollers each 38.3 mm. in diameter which were wound doubly with vinyl tape.

The several films fused with the aforesaid sample fasteners 1–8 were folded on the central line between the pair of parallel male and female talon ridges and simultaneously run between the gap of the fastener interlocking rollers at a speed of 25 meters per minute to effect their continuous engagement, the three varying gaps between the rollers of 1.3, 1.5 and 1.7 mm. being used. The degree of ease or difficulty with which the several sample fasteners could be brought into engagement are shown in Table II, below. In Table II, this degree of ease or difficulty with which the fasteners could be brought into engagement is shown by a valve obtained by counting the number of places where the fastener were not in engagement per 2000 meters length of the fastener, the count being made on three runs and indicating the minimum and maximum values. The mark X in the table shows that there was practically no engagement.

TABLE II

[Number of places where fasteners were not in engagement per 2000 meters of the fastener]

| Sample No. | Gap of Rollers | | |
|---|---|---|---|
| | 1.3 mm. | 1.5 mm. | 1.7 mm. |
| 1 | 6–8 | 11–13 | 13–15 |
| 2 | X | X | X |
| 3 | 0 | 0 | 0–2 |
| 4 | 0 | 0–1 | 0–2 |
| 5 | 6–7 | 10–12 | 13–14 |
| 6 | 0–1 | 1–3 | 3–5 |
| 7 | 3–5 | 4–6 | 6–8 |
| 8 | 21–25 | 24–29 | 27–33 |

*Example 2*

Bags were made from films fused with the sample fasteners 1–8 of Example 1, using the conventional bag making apparatus for synthetic resin films. The fastening strength of the fasteners was measured from the inside as well as outside of the bags at a temperature of $20\pm1°$ C. and a humidity of $65\pm5\%$. The results of the measurements are shown in Table III, below. The fastening strengths given in this table are average values obtained by measuring ten pieces of one sample.

TABLE III

| Sample No. | Fastening Strength (g./cm.) | |
|---|---|---|
| | Outside | Inside |
| 1 | 38.6 | 166.2 |
| 2 | ---- | ---- |
| 3 | 42.6 | 181.3 |
| 4 | 41.8 | 177.4 |
| 5 | 40.1 | 173.5 |
| 6 | 30.6 | 201.3 |
| 7 | 26.3 | 214.0 |
| 8 | 8.7 | 401.0 |

The superiority of the synthetic resin fastener of this invention over the conventional fasteners with respect to the ease with which the male and female talons can be brought into engagement and the state of this engagement should be apparent from the foregoing two examples. Further, it should be apparent from these examples that when the height of the peaked ridge of the female talon is either too high or too low, the operation of engaging the male and female talons of the fastener is rendered difficult and thus is undesirable. In addition, when the inclination of the peaked ridge towards the inside is too great, this also is undesirable, as the bag becomes easily openable from the outer side.

I claim:

1. A synthetic resin fastener comprising, in combination, a female talon having a pair of facing, base ridges whose distal ends are provided, respectively, with an obliquely, inwardly and downwardly facing long-pointed projection and a similarly constituted short-pointed projection, and in the space between said facing ridges a peaked ridge having a triangular section which inclines towards said long-pointed projection at an angle up to 10 degrees with respect to a perpendicular to the base plane of the female talon; and a male talon having respectively at its two sides an obliquely, outwardly and upwardly facing deep hook groove and a similarly constituted shallow hook groove, and in its central part a valley like groove of triangular section corresponding with the peaked ridge of said female talon, the configuration of said deep and shallow hook grooves being such that they are capable of fittingly engaging with the respective long and short pointed projections of said female talon.

2. In a synthetic resin film bag having a reclosable fastener comprising a pair of facing ridges consisting of male and female talons of synthetic resin fused to the mouth part of the bag, the improvement wherein said female talon has a pair of facing base ridges, having at their distal ends, respectively, an obliquely, inwardly and downwardly facing long-pointed projection and a similarly constituted short-pointed projection, and in the space between said pair of base ridges, a projecting peaked ridge of triangular section which inclines towards said long-pointed projection, said base ridge with the long-pointed projection being toward the inside of the bag from said peaked ridge, said peaked ridge being at an angle up to 10 degrees with respect to a perpendicular to the base plane of the female talon, said base ridge with the short-pointed projection being disposed on the mouth side of the bag from said peaked ridge, said male talon having respectively at its two sides an obliquely, outwardly and upwardly facing deep hook groove and a similarly constituted shallow hook groove, and in its central part a valley like groove of triangular section corresponding with the peaked ridge of said female talon, the configurations of said deep and shallow hook grooves being such that they are capable of fittingly engaging with the respective long and short-pointed projections of said female talon.

References Cited

UNITED STATES PATENTS

| | | |
|---|---|---|
| 3,038,225 | 6/1962 | Ausnit. |
| 3,198,228 | 8/1965 | Naito. |

FOREIGN PATENTS

| | | |
|---|---|---|
| 706,084 | 3/1965 | Canada. |
| 943,668 | 12/1963 | Great Britain. |

BERNARD A. GELAK, *Primary Examiner.*